United States Patent
Canonico et al.

(10) Patent No.: US 12,502,632 B2
(45) Date of Patent: Dec. 23, 2025

(54) INTELLIGENT FILTER CONSTRUCTION FOR ELECTRICAL APPLIANCES, IN PARTICULAR DRYING/WASHING-DRYING MACHINES, METHOD FOR MAKING THE CONSTRUCTION, AND METHOD FOR DETECTING IN REAL TIME A PARTIAL OR TOTAL CLOGGING OF THE CONSTRUCTION AND A VALUE OF RESIDUAL MOISTURE FOR OPTIMIZING THE OPERATING CYCLE OF THE APPLIANCE

(71) Applicant: SAATI S.P.A., Appiano Gentile (IT)

(72) Inventors: Paolo Canonico, Appiano Gentile (IT); Paolo Debandi, Appiano Gentile (IT); Carmine Lucignano, Appiano Gentile (IT); Anna Maria Muzyczuk, Appiano Gentile (IT)

(73) Assignee: SAATI S.P.A., Appiano Gentile (IT)

( * ) Notice: Subject to any disclaimer, the term of this patent is extended or adjusted under 35 U.S.C. 154(b) by 0 days.

(21) Appl. No.: 18/378,637

(22) Filed: Oct. 10, 2023

(65) Prior Publication Data
US 2024/0123387 A1      Apr. 18, 2024

Related U.S. Application Data

(62) Division of application No. 15/574,150, filed as application No. PCT/IB2016/000640 on May 13, 2016, now abandoned.

(30) Foreign Application Priority Data

May 14, 2015   (IT) .......................... MI2015A000681

(51) Int. Cl.
*B01D 46/00*      (2022.01)
*B01D 39/08*      (2006.01)
(Continued)

(52) U.S. Cl.
CPC ....... *B01D 46/0086* (2013.01); *B01D 39/083* (2013.01); *B01D 46/0001* (2013.01);
(Continued)

(58) Field of Classification Search
CPC .............. B01D 46/0086; B01D 39/083; B01D 46/0001; B01D 46/10; B01D 46/44;
(Continued)

(56) References Cited

U.S. PATENT DOCUMENTS 3,718,982 A * 3/1973 Deaton .................... D06F 58/22
                                                          219/400
6,742,387 B2 * 6/2004 Hamamoto ............ G01N 19/10
                                                         73/335.04
(Continued)

*Primary Examiner* — T. Bennett Mckenzie
(74) *Attorney, Agent, or Firm* — Intellectual Property Consulting LTD; Daniel O'Byrne

(57) ABSTRACT

An intelligent filter construction for household appliances, in particular for drying/washing-drying machines, for separating solid particles from liquid or gaseous fluids, comprises a synthetic monofilament precision fabric material, of a weft and warp type, with which is integrally associated a capacitive sensor adapted to measure in real time values of a moisture in an air flow passing through the fabric material thereby optimizing the household appliance operating cycle.

17 Claims, 6 Drawing Sheets

(51) Int. Cl.
*B01D 46/10* (2006.01)
*B01D 46/44* (2006.01)
*D06F 58/22* (2006.01)
*D06F 58/45* (2020.01)
*D06F 105/34* (2020.01)
*D06F 105/58* (2020.01)

(52) U.S. Cl.
CPC ............. *B01D 46/10* (2013.01); *B01D 46/44* (2013.01); *B01D 46/442* (2013.01); *D06F 58/22* (2013.01); *D06F 58/45* (2020.02); *B01D 2239/0478* (2013.01); *B01D 2239/1233* (2013.01); *B01D 2279/45* (2013.01); *D06F 2105/34* (2020.02); *D06F 2105/58* (2020.02)

(58) Field of Classification Search
CPC .......... B01D 46/442; B01D 2239/0478; B01D 2239/1233; B01D 2279/45; D06F 58/22; D06F 58/45; D06F 2105/34; D06F 2105/58; D06F 39/10
USPC ............................................................ 95/10
See application file for complete search history.

(56) References Cited

U.S. PATENT DOCUMENTS

| | | | |
|---|---|---|---|
| 2006/0005516 A1* | 1/2006 | Pikesh .................. | B01D 46/76 55/467 |
| 2007/0175192 A1* | 8/2007 | Niakan ................. | B01D 46/521 55/486 |
| 2008/0148597 A1* | 6/2008 | Kim ........................ | D06F 58/50 34/524 |
| 2011/0167662 A1* | 7/2011 | Dittmer .................. | D06F 58/22 34/82 |
| 2012/0124859 A1* | 5/2012 | May ........................ | D06F 34/28 34/572 |
| 2012/0206731 A1* | 8/2012 | Sano ........................ | G01J 3/26 356/450 |
| 2014/0360040 A1* | 12/2014 | Sartor .................... | D06F 58/22 34/82 |

* cited by examiner

INTELLIGENT FILTER CONSTRUCTION FOR ELECTRICAL APPLIANCES, IN PARTICULAR DRYING/WASHING-DRYING MACHINES, METHOD FOR MAKING THE CONSTRUCTION, AND METHOD FOR DETECTING IN REAL TIME A PARTIAL OR TOTAL CLOGGING OF THE CONSTRUCTION AND A VALUE OF RESIDUAL MOISTURE FOR OPTIMIZING THE OPERATING CYCLE OF THE APPLIANCE

BACKGROUND OF THE INVENTION

The present invention relates to, according to a first aspect thereof, an intelligent filter construction for household appliances, in particular for drying and washing-drying machines.

In a second aspect thereof, the present invention relates to a method for making the intelligent filter construction according to the invention.

In a third aspect thereof, the present invention relates to a method for detecting in real time a partial or complete clogging of the inventive intelligent filter construction.

In a fourth aspect thereof, the present invention relates to a method for detecting the value of residual moisture in the operating environment in order to optimize the operating or working cycle of the household appliance.

As is known, a filtering element for drying and washing-drying machine typically comprises one or more filtering media, adapted to separate/catch solid particles of different particle size.

The above mentioned filtering media are generally made by different making processes and materials, having different filtering/holding/perspiring/cleaning capabilities.

In the very broad range of the mentioned prior filtering means, it is possible to mention non-woven fabrics, foams, membranes, paper materials, multi-thread fabrics, metal monofilament or synthetic monofilament precision fabrics.

Filtering media such as paper and membrane materials have a very high filtering efficiency, even with respect to sub-micrometric particles; however, they have a nearly zero holding capability and very low perspiring features, thereby highly impacting on the energy consumption if the mentioned media are used in the above mentioned household or electric appliances.

Actually, media such as multi-thread fabric materials are not suitable for providing in a constant manner a given filtering efficiency, because of their intrinsic lack of precision.

On the other hand, non-woven/foam materials, even if they have a high particle restraining capability, are also not suitable to provide a high and constant filtering efficiency for particles within a given particle size range, since a distribution of the pores of these materials cannot be properly controlled and since they typically have very high dispersions. Moreover, the particle restraining capability of the latter filtering media is provided by a tridimensional structure allowing particles with a size larger than that of the pores to be trapped therein.

It should be moreover pointed out, and this is true for all the above mentioned prior filtering means, that the possibility of recovering the filtering media to their starting conditions, after a use thereof, requires any clogged particles to be removed, which is very difficult to be carried out.

Moreover, it is to be further pointed out that, in prior electric or household appliances, an operating cycle end is typically determined by a dedicated timer or, as an alternative, by monitoring a residual moisture, which monitoring, at present, is a rather approximate one, since it is based on a measurement of the residual moisture of the linen article contacting a moisture sensor arranged within the household appliance basket or drum.

Thus, the above mentioned prior residual moisture monitoring provides only indicative results or measurements, since, at an output of the household appliance, linen articles differently dried would be present, and accordingly with different residual moisture amounts, depending on the physical-geometrical properties of said linen articles and a distribution of all the other articles in the household appliance drum.

Moreover, with respect to prior drying and washing-drying machines, it is typically suggested to properly clean the filtering element at the end of each apparatus operating cycle.

Such an approach not only is an inconvenient one for a user, but it is of a merely conservative type, since the filter could probably continue to operate in an efficient manner for several further cycles without deteriorating a normal operation of the household appliance.

Thus, the prior art does not teach or suggest a process or method for detecting in real time a clogging level, either partial or complete, of the household appliance filter, in order to inform a user of an effective need to properly clean the filter.

SUMMARY OF THE INVENTION

Accordingly, in view of the above mentioned prior art drawbacks, the aim of the present invention is to provide such an intelligent filter construction for household or electric appliances, in particular drying and washing-drying machines, adapted to always provide a good filtering efficiency with respect to a given particle size range, thereby preventing said particles from passing through the filter construction, which would prevent the downstream household appliances from properly operating.

Within the scope of the above mentioned aim, a main object of the present invention is to provide such an intelligent filter construction which may be easily restored to its starting operating condition, that is may be properly cleaned from polluting materials accumulated thereon, and this by a simple manual operation by the household appliance user, or also by an automated cleaning operation, to be performed exclusively at a proper and necessary time.

Another object of the present invention is to provide such an intelligent filter construction in which the geometrical properties of the filtering element proper may be preset in a manner adapted to assure not only a given filtering efficiency but, meanwhile, a preset value of the air flow required for a proper operation of the household appliance, and for always keeping the original power efficiency of said appliance.

Another object of the present invention is to provide a method for making the inventive filter construction, which method is very simple, inexpensive and reliable, in particular a weaving method of a monofilament warp and weft type, and, moreover, with the possibility of easily integrating in the obtained textile construction sensing means for detecting in real time the moisture passing through the filter, in order to optimize the operation of the household appliance.

Yet another object of the present invention is to provide a monitoring method for monitoring, in real time, a clogging degree of the filter construction, allowing the user to properly clean the filter construction exclusively when a clogging thereof arrives at such a value as to prevent the household appliance from properly operating.

According to the present invention, the above mentioned aim and objects, as well as yet other objects, which will become more apparent hereinafter, are achieved by an intelligent filter construction for household or electric appliances of the above indicated type, by a method for making the filter construction as well as a method for detecting in real time either a partial or complete clogging of said filter construction, as claimed in the appended claims.

BRIEF DESCRIPTION OF THE DRAWINGS

Further characteristics and advantages of the invention will become more apparent hereinafter from the following detailed disclosure of currently preferred embodiments thereof which are illustrated, by way of an indicative but not limitative example, in the accompanying drawings, where:

FIG. 4A showing an output of the capacitive sensor, that is its capacity variation as the moisture changes in real time; and FIG. 4B showing a relative capacity variation with a variation of the relative moisture, the diagrams or graphs 4A and 4B being obtained from measurements carried out on a filtering element with a capacitive element of a 25 mm×25 mm size "built-in" in the precision fabric material.

From these diagrams it can be seen that, in case of a clogged filter, the capacity variation (the bold curve) and accordingly the read moisture is greatly different from the curves showing a non-clogged filter.

Figure 7:
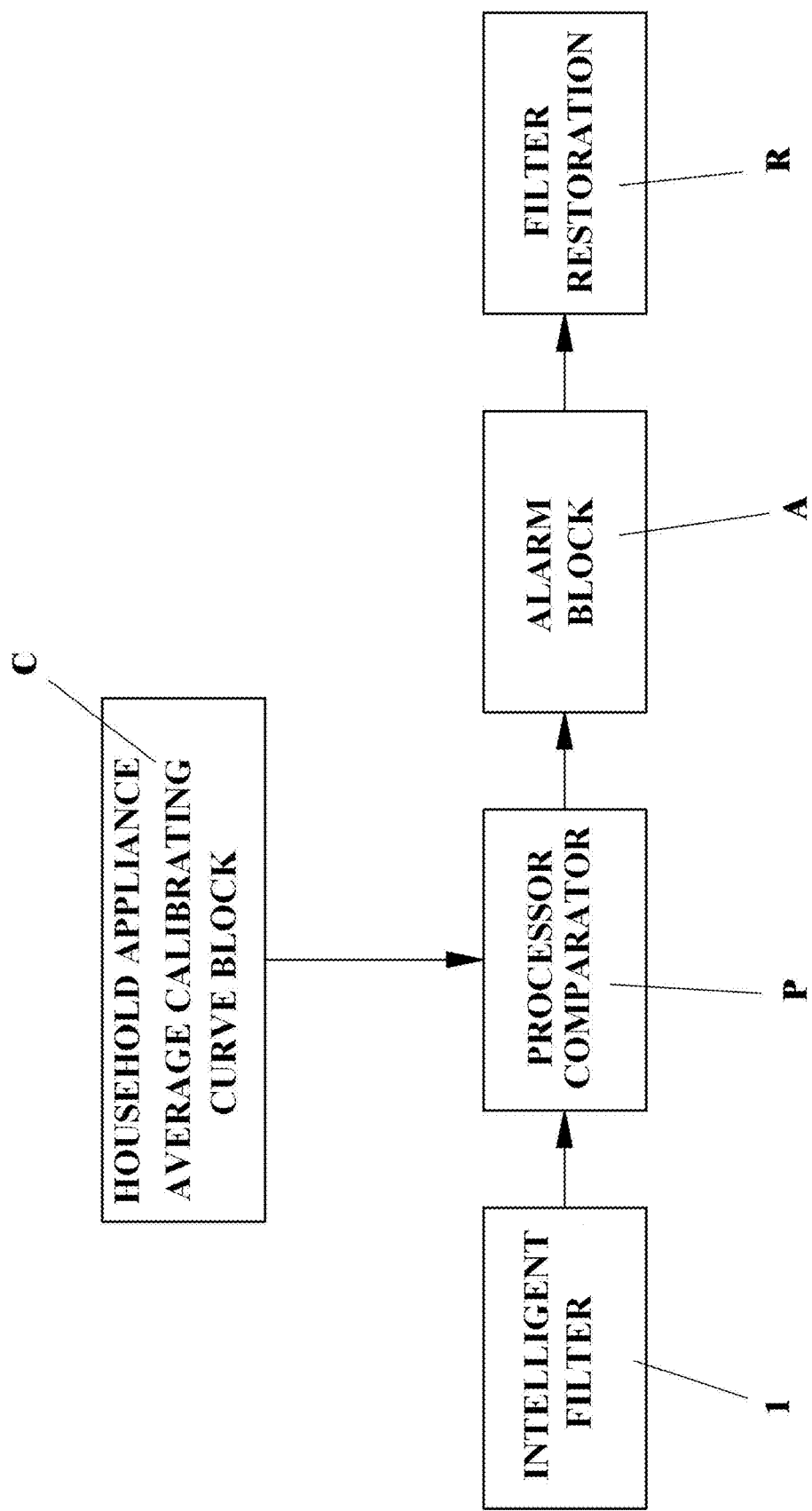

FIG. 7 shows a schematic block/operating diagram useful for understanding a possible embodiment of a method for determining in real time a partial and/or complete clogging of the inventive intelligent filter construction, according to a further main aspect of the present invention.

DESCRIPTION OF THE PREFERRED EMBODIMENTS

Figure 1:
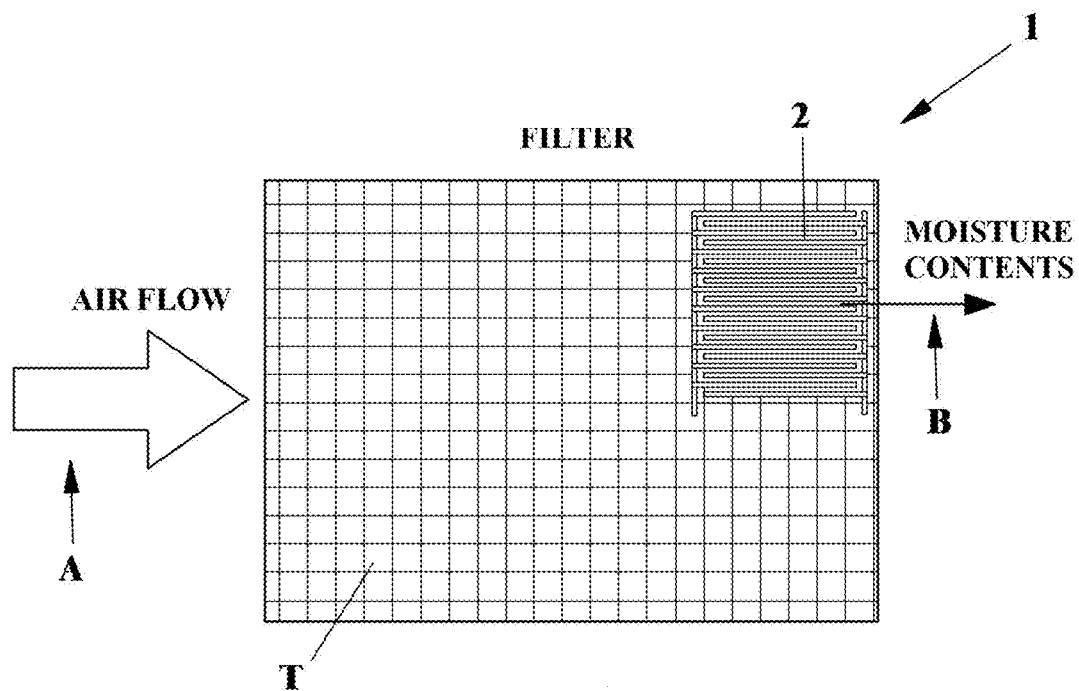
FIG. 1 shows a preferred embodiment of an intelligent filter construction constituted by a synthetic monofilament precision fabric material, constructed with a weft and warp structure, with associated a moisture capacitive sensor element arranged at and covering only a corner (the right top corner in the figure) of the precision fabric piece.

With reference to the above mentioned figures and, more specifically, to FIG. 1, the intelligent filter construction according to the present invention has been herein generally indicated by the reference number 1.

The arrow A in FIG. 1 shows the direction of the air flow passing through the filter construction 1, whereas the arrow B shows the output of the built-in capacitive sensor 2 which is integrated, according to the present invention, in the filter fabric material T and being specifically designed for detecting the moisture contents of the air flow through the filter, and constituting the core of the present invention.

In the preferred embodiment, the fabric material T is a weft-warp type of precision fabric material, made of a synthetic monofilament which, as aforesaid, is partially coated by an electrically conductive pattern to provide the capacitive sensor element 2.

In FIG. 1, said electrically conductive pattern or sensor 2 covers or coats only a portion of the filter fabric, in particular a corner portion or region of the fabric material T.

Advantageously, in a preferred embodiment, the fabric T is a synthetic monofilament precision fabric made of a PET material, having a mesh opening of 53 μm, a free surface of 40%, and a thickness of 48 μm, the flat capacitive element being preferably made by a silk-screen process using a silver based conductive ink, with a total size of the capacitive element of 100 mm×100 mm, and with 25 electrically conductive mutually interdigitated fingers, and with an electrically conductive track thickness of 2 mm and a finger spacing of 2 mm.

Figure 2:
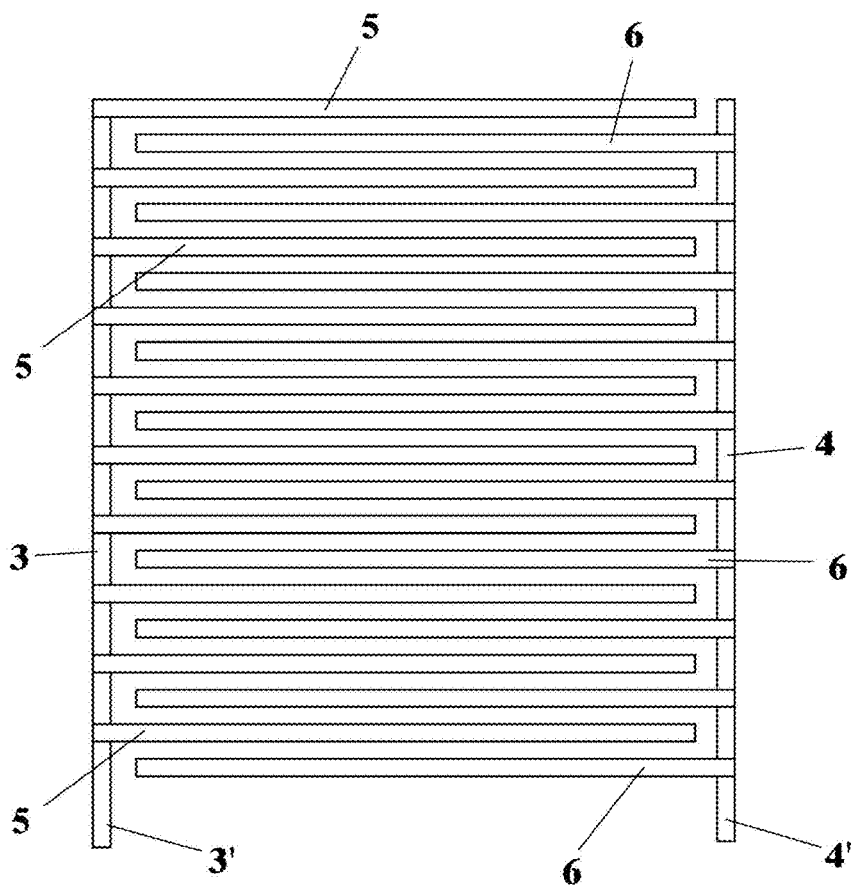
FIG. 2 is a partial detail view, on an enlarged scale, of FIG. 1 showing a preferred embodiment of the capacitive moisture sensor shown in FIG. 1, which, according to the present invention, is "integrated" or "built-in" in the precision fabric material.
Figure 3:
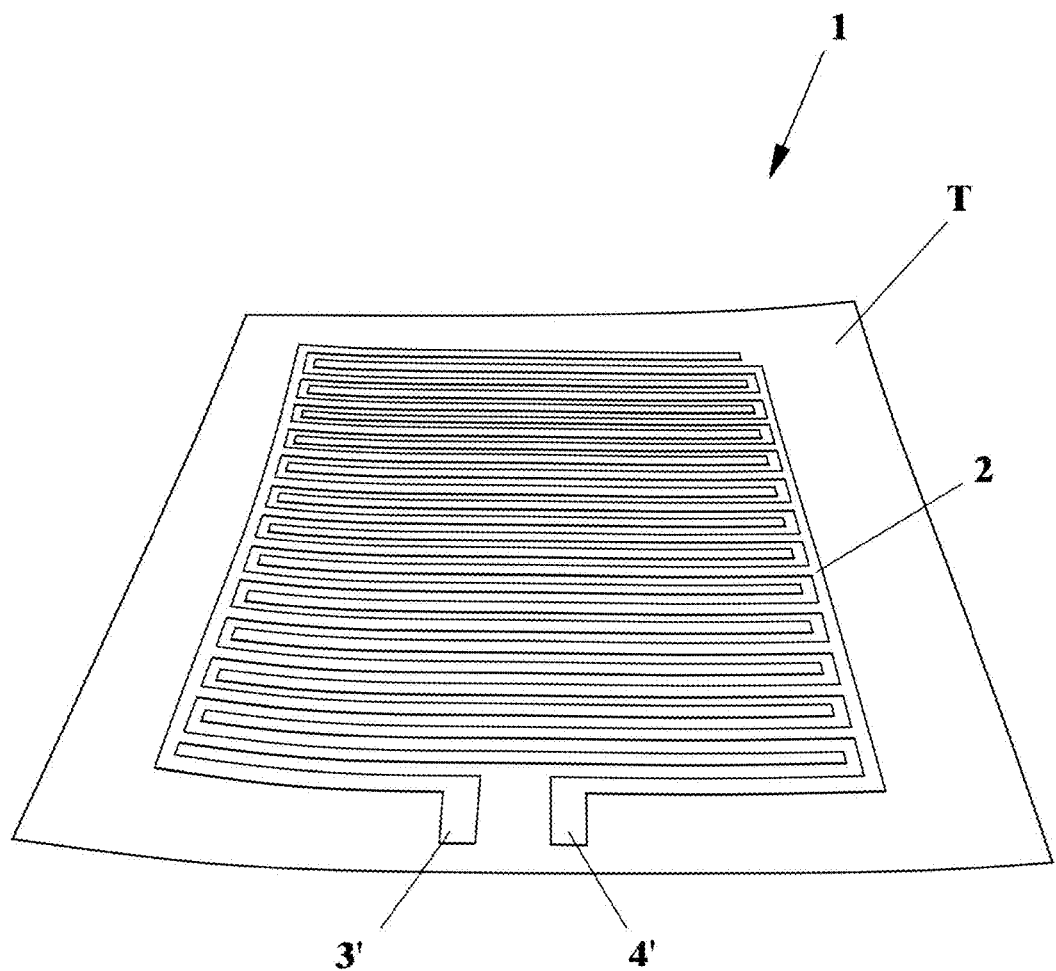
FIG. 3 is a schematic view showing a further more preferred embodiment of the inventive filter construction, including the capacitive sensor element.
Figure 4A:
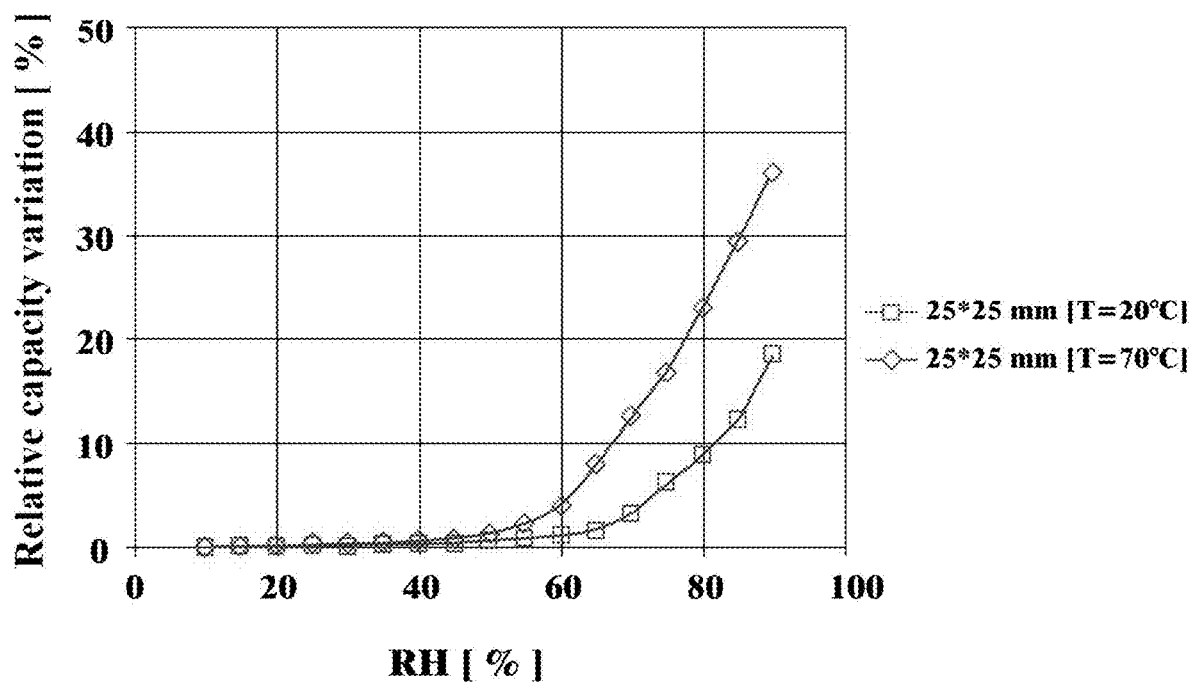
FIGS. 4A and 4B show an output of the intelligent filter construction under preset temperature conditions at 20° C. and 70° C., with a preset relative moisture variation from 10 to 95%.
Figure 4B:
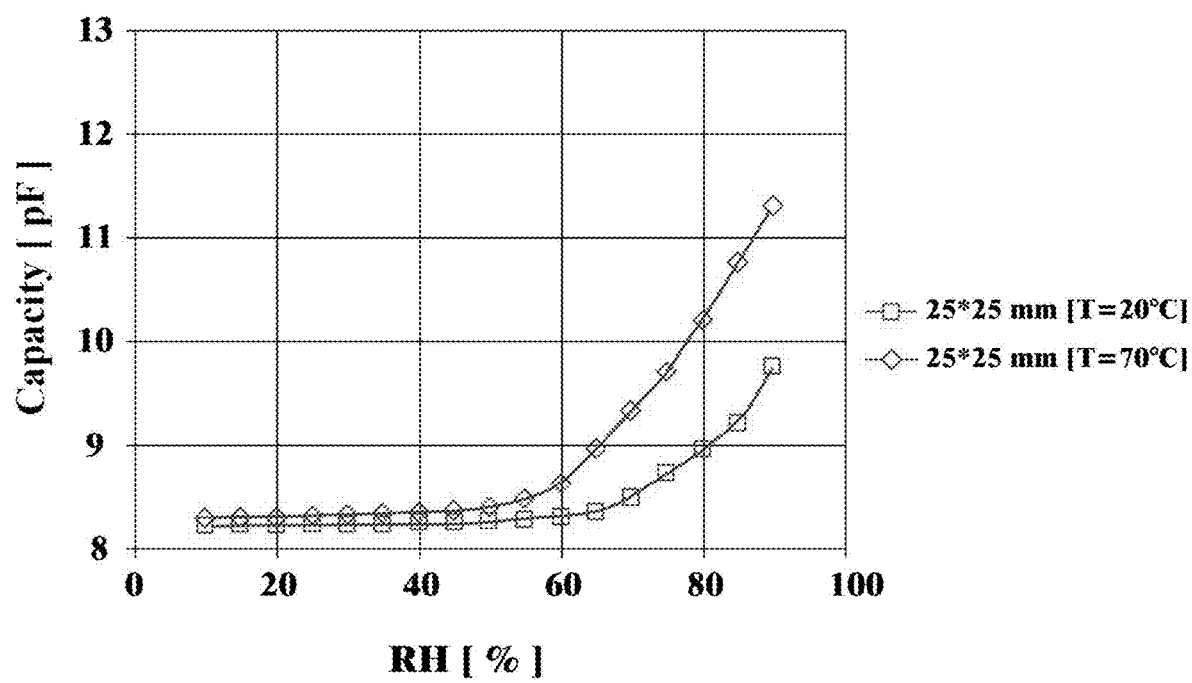
Figure 5:
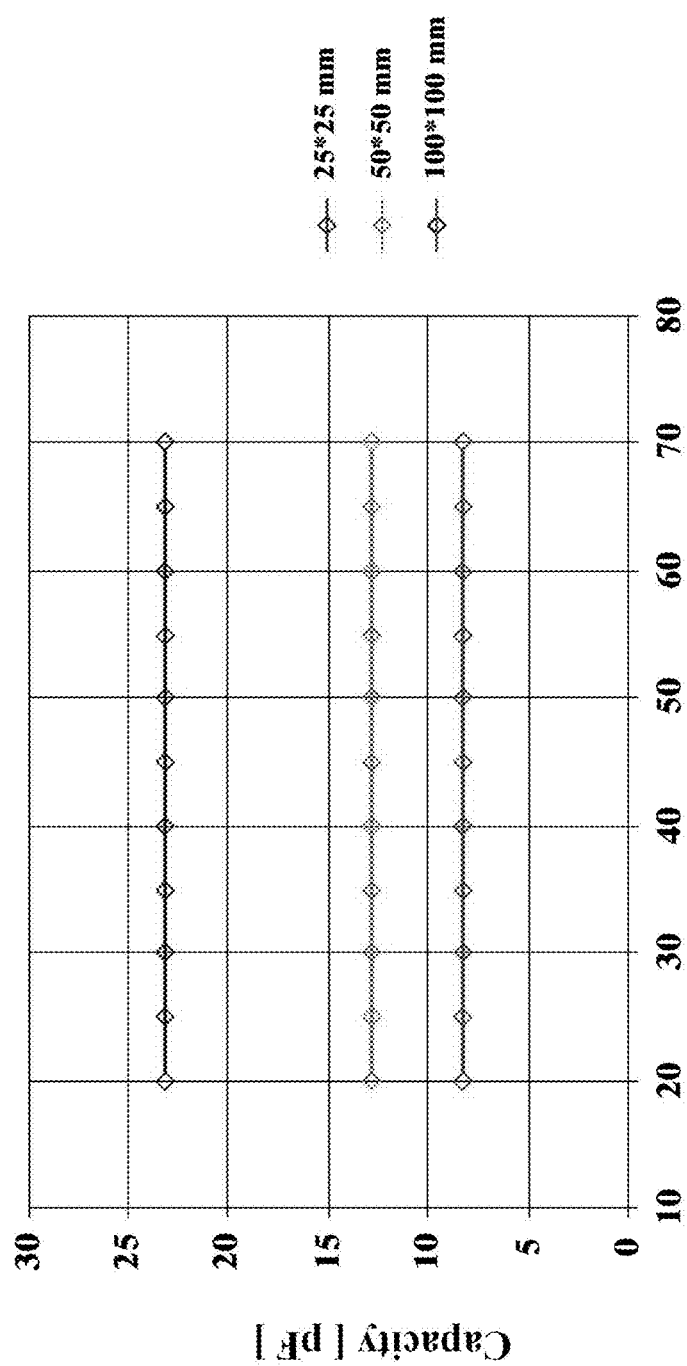
FIG. 5 shows further output graphs of the intelligent filter construction in variable temperature conditions, for three different dimensions or sizes of the filtering element, that is 25×25; 50×50; and 100×100 mm², and for a preset moisture amount. The output, as is clearly shown in the graphs, is constant and accordingly independent of the temperature value.

The conductive pattern or sensor 2 is shown on an enlarged scale in FIG. 2 and comprises a substantially rectangular conductive/capacitive pattern defined, in the embodiment disclosed, by a first and second straight end or side outer electrically conductive elements (or tracks) 3 and 4.

As shown, the straight or rectilinear elements 3 and 4 substantially define the plates of a capacitor, from each of which respectively extend a first and second plurality of said conductive straight or rectilinear finger elements 5 and 6 being mutually spaced from one another, said finger elements 5 of the first plurality being operatively interdigitated between the corresponding finger elements 6 of the second plurality.

Advantageously, moreover, each side end element 3 and 4 comprises a terminal or end bottom free portion 3' and 4', for providing an electrical coupling to processing means for processing and comparing the moisture values, which will be disclosed in a more detailed manner hereinafter.

Thus, owing to the provision of said "built-in" capacitive sensor 2 in the filter construction 1, said filter construction will be adapted to detect, in real time, the moisture value of air passing therethrough, and accordingly a possible partial or complete clogging of the filter itself.

Moreover, said filter may be used for determining the residual moisture value in the operating environment, and accordingly to restore a useful value to optimize the operating cycle of the household or electric appliance.

According to the present invention, and as above mentioned, the fabric material T is a precision fabric material so designed as to provide a very high and selective filtering of solid particles (the so-called "lints" in case of linen articles) having a size larger than the fabric material mesh openings.

According to a further aspect of the present invention, the filtering fabric or medium T may comprise at least a first fabric layer, either co-molded or not, with a metal and/or plastics support element (not shown).

From the above disclosure it should be apparent that the intelligent filter construction 1 according to the present invention may be used not only in the mentioned household or electric appliances, but also in all applications where, in addition to filtering solids, liquids or gases, it would be also necessary to detect the environment moisture level of the filter operating environment, as well as the filter clogging level, to indicate a real requirement of restoring the filter to its starting configuration, and this exclusively when this is necessary, that is with the filter excessively clogged, thereby releasing a user from the tedious work of cleaning the filter after each operating cycle of the household appliance, as it occurs with the prior art filters.

According to a further aspect of the present invention, the synthetic monofilament precision fabric material T, either co-molded or not, with a plastics and/or metal support, may also be partially suitably coated by the above mentioned electrically conductive pattern 2, to be carried out in an integral manner, at any desired position and with any suitable size on said precision fabric material T, thereby providing, as already mentioned, a plane or flat capacitive element adapted to detect in real time the working or operating environment moisture value as well as a partial/complete clogging of the filter.

Said precision fabric material T may be made, preferably though not exclusively, starting from a PET, PA, PP, PPS, PEEK, PLA, PTFE, PVDF, PE, PVDC, PEN monofilament, having a thread or filament diameter from 15 to 500 microns, a monofilament per centimeter density from 4 to 260, and a monofilament thickness from 35 microns to 1 mm.

Moreover, said fabric material T may preferably have a mesh opening from 5 µm to 1 mm, more preferably typically from 35 µm to 200 µm, with a top free surface over 30%.

Furthermore, the fabric material T may be also coated, if necessary, by any desired coating processes (such as dip coating, plasma coating, spray coating, foam coating, knife coating, sol gel, ink-jet coating) adapted to provide particular surface properties such as hydrophobic, antistatic, hydrophilic properties, as well as dirt releasing and antimicrobic characteristics.

Said fabric material T may also be coated by physical or chemical depositing processes, with a thin electrically conductive material layer, such as of silver, copper, aluminium, steel, titanium and so on.

Furthermore, said capacitive sensor element 2, suitably designed for the intended application, may be applied on the base fabric material T by different applying methods.

In particular, after having made a suitable layer of a metal material on the fabric surface, to selectively remove metal materials and provide a desired pattern, it would be possible in particular to use a high density energy or power source.

As an alternative, the fabric material T may be partially coated by a coating mask before performing the depositing process of the electrically conductive material.

After having coated the conductive pattern 2, the mask can be removed thereby providing the desired conductive sensor.

According to yet another method for making the inventive capacitive sensor 2, the fabric material may be fully coated/laminated by an electrically conductive material thin layer, and then an undesired part may be removed by a chemical etching process.

As an alternative, the fabric material T may also be partially coated by an electrically conductive material by means of an inkjet printing method, by using conductive ink materials.

In the preferred embodiment of the present invention, the conductive pattern, that is the capacitive sensor 2, is deposited by a silk printing process, by using a stencil adapted to the substrate fabric type and further using electrically conductive silk printing ink materials.

The stencil used should provide a required silk printing precision thereby providing a preset geometry of the sensor 2 and accordingly a given moisture variation capability and response.

The flat capacitive sensor 2, coated on the fabric material, will close, only partially, as above mentioned, the fabric mesh openings and may be further protected, by a dielectric coating, from any oxidation and possible mechanic abrading phenomena.

In this connection, it should be apparent that the air flow passing through the filter fabric material T in which is built-in the subject capacitive sensor system 2 will have a preset residual moisture value, determining its permittivity and accordingly the capacity value read by the capacitive sensor 2.

Thus, as moisture changes, the above physical properties will also change, and the sensor 2 will measure in real time the actual residual moisture value in the air flow.

According to the present invention, the residual moisture value from the intelligent filter output can be further processed to optimize the household appliance operating cycle.

Obviously, the capacity absolute value thus read will be a function of the pattern 2 size, whereas the sensitivity of the intelligent filter according to the present invention will increase with the mesh density of the flat capacitive sensor 2; in other words, upon setting the sensor size 2, its sensitivity will increase by reducing the spacing between the above mentioned finger elements and the size of the latter.

More specifically, the moisture value read by the sensor 2 will be accordingly independent of the temperature variations thereby said sensor will be particularly suitable to be used in the herein considered household appliance since, during a normal operation of the latter, temperature variations will occur which, otherwise, could have made inefficient the method for detecting in real time the filter construction clogged condition.

Thus, the intelligent filter according to the present invention will provide its filtering operation by restraining solid particles which, over time, will be deposited on the surface of the filtering fabric material T.

With the deposit occurring on the sensing area of the filter, that is on the sensor 2 itself, the relative moisture values measured by said sensor will change in comparison with an otherwise measured value in the air flow under standard conditions.

In other words, the deposit accumulated on the sensitive area of the filter, that is on the sensor 2, will operate as a cushion (absorbing a given moisture amount) thereby providing higher read moisture values.

Figure 6A:
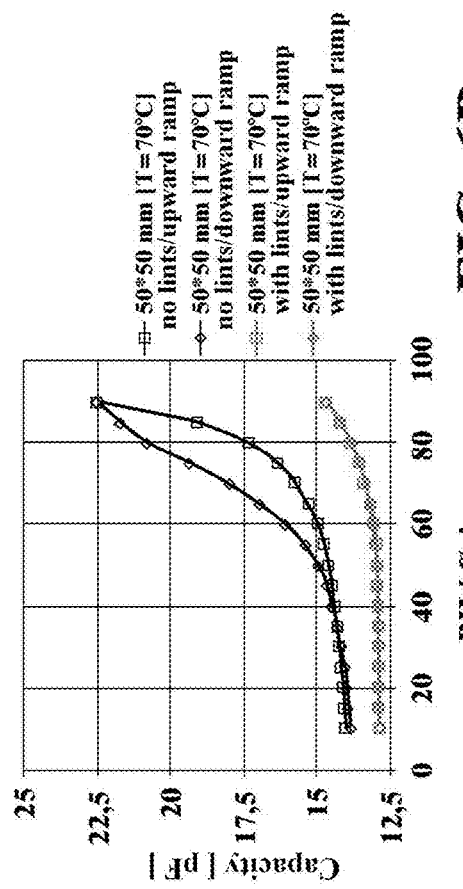
FIGS. 6A to 6D show further output graphs or diagrams of the intelligent filter construction in a clogged condition, for two different sizes of the filtering element, that is 25×25 and 50×50 mm², at a temperature of 70° C. and at a variable moisture condition.
Figure 6B:
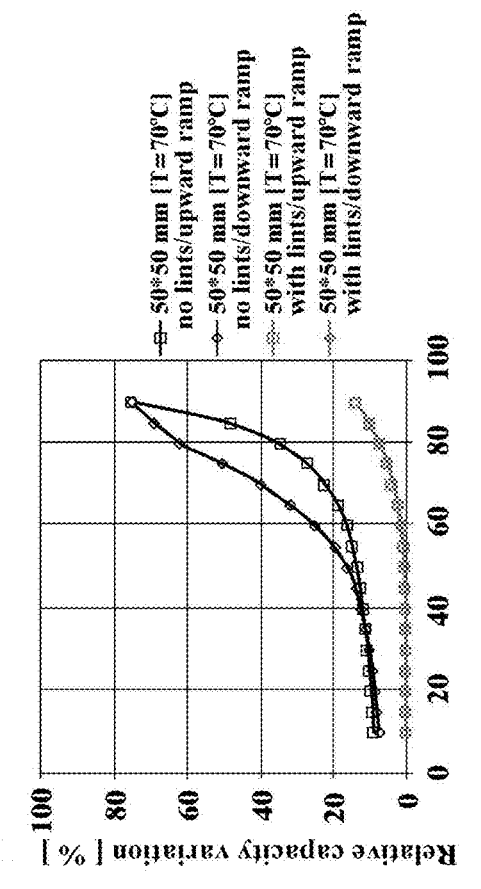
Figure 6C:
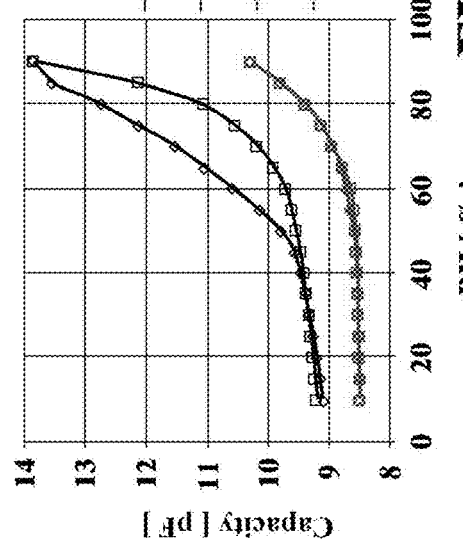
Figure 6D:
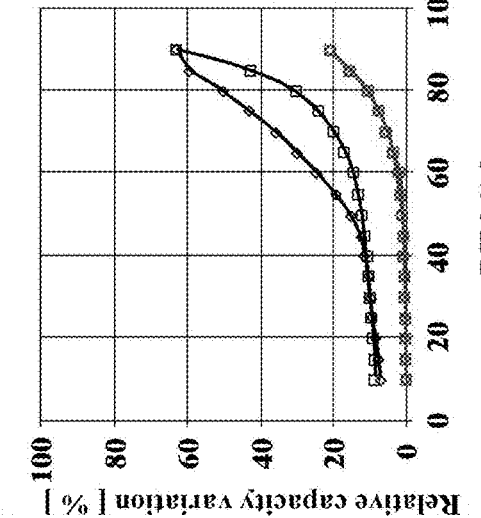

According to a main aspect of the present invention, and with reference to FIGS. 6A and 6C, the method for detecting in real time the moisture value of the air passing through the filter and accordingly the partial or complete clogging of said filter, provides to form at the start an average calibrating curve of the household appliance (i.e. of the air moisture with respect to the operating cycle time) for a given operating or work load, and to continuously compare the calibrating curve with the values read by the sensor 2.

If anomalous capacity/moisture values are read, then a corresponding signal will be processed so as to provide an alarm output to inform the user of the fact that the filter is clogged, thereby said user will be able to perform the necessary cleaning operation, either in manual or in automatic manner, at a proper time.

In other words, the inventive method for detecting in real time the partial or complete clogging of the filter construction provides a first operating step of forming the household appliance calibrating curve, by setting the initial or starting load conditions (that is a weight and moisture value) in order to correlate a typical value of the air flow residual moisture with a given period of time.

The above mentioned inventive method or process to detect in real time either a partial or complete clogging of the subject intelligent filter is better shown in the operating diagram of FIG. 7, wherein the output of the intelligent filter 1 is applied to an input of a processor comparator block P, to another input of which is applied an average calibrating curve of the household appliance processed in the block C.

The output of the processor comparator P is operatively connected to an alarm block A and accordingly, as the processor P detects that the air flow moisture (from the filter 1 output) exceeds a preset value (related to the average calibrating curve of the household appliance) the alarm A will be energized to signal to the user to properly clean either manually or automatically the clogged filter.

It should be apparent that the partial or complete clogging of the filter will correspond to a noticeable variation of the moisture/capacity value read by the sensor 2; in other words, even if the average moisture value in the operating area is always the same, however an accumulation of particles will cause a local variation of the air flow, up to a complete clogging of the sensor, thereby said sensor will have a continuously decreasing sensitivity to the air flow moisture value, since it will be insulated by accumulating particles, and will be increasingly sensitive to a specific value of the moisture held in accumulating particles, with the consequence that the moisture values measured by the filter will be greatly anomalous.

In this connection it should be pointed out that it would be possible, for example, to set threshold values of a relative capacity variation in function of the time (under preset load conditions) thereby, at a time at which a relative variation read by the sensor 2 would exceed the mentioned threshold values, the filter will provide the mentioned output which, being processed as indicated in the processing block P, will energize the mentioned alarm to signal the user to clean the filter, but only in case of said alarm, and not after each use of the household appliance.

From the above, it should be apparent that the present invention fully achieves the intended aim and objects.

In fact, the invention has provided, according to a first aspect thereof, an intelligent filter construction, in particular for use in the household appliance field, allowing to measure in real time the moisture of an air flow passing therethrough, with a consequent possibility of optimizing the household appliance operating cycle.

Moreover, the intelligent filter construction according to the present invention allows a user to omit tedious continuous cleaning operations and allows said user to clean the filter construction exclusively as it is necessary, depending on a real filter clogging, which is determined in real time by the clogging determining method constituting a further important aspect of the invention.

Furthermore, the intelligent filter construction according to the present invention allows to provide the household appliance with a very simple processor device, operatively driven by the subject capacitive sensor to process in real time the filter clogging data and drive an alarm system for manually or automatically cleaning the filter, exclusively if/when this is necessary.

Although the intelligent filter construction according to the present invention has been disclosed above with reference to a currently preferred embodiment thereof, the disclosed embodiment is susceptible to several modifications and variations all coming within the scope of the invention.

For example, the material of the disclosed precision fabric, as well as that of the capacitive sensor, the dimensional values of the sensor capacity and any other dimensional parameter of the intelligent filer according to the present invention may be selected depending on the contingent requirements and a specific use of the intelligent filter construction, besides the above mentioned use in said washing-drying machines.

Accordingly, the scope of the invention will be defined, rather than by the preceding disclosure, by the enclosed claim equivalent scope instead.

The invention claimed is:

1. A method for detecting in real time a partial and/or complete clogging of a filter construction arranged in a household drying machine for separating solid particles from an air flow in the drying machine, said method comprising at least the steps of:

providing said filter construction consisting of: a synthetic monofilament fabric material of a weft and warp type, said synthetic monofilament fabric material having a mesh opening size between 35 μm to 200 μm; and a flat capacitive moisture sensor forming an electrically conductive-capacitive pattern adapted to measure in real time the values of a moisture contained in said air flow passing through said synthetic monofilament fabric material, said electrically conductive pattern having a flat configuration applied on said synthetic monofilament fabric material and consisting of first and second end rectilinear conductive track elements, forming two capacitor plates and from each of which respectively extend a first and a second plurality of rectilinear and parallel mutually spaced conductive finger elements, the finger elements of said first plurality being operatively interdigitated with the corresponding finger elements of said second plurality, said electrically conductive-capacitive pattern covering only a corner portion of said synthetic monofilament fabric material;

providing an average calibrating curve of said household drying machine;

detecting and measuring in real time an actual value of residual moisture in an air flow passing through said filter construction at said flat capacitive moisture sensor;

comparing in real time said actual value of residual moisture with said average calibrating curve;

generating an alarm signal when said actual value of residual moisture exceeds a preset threshold value; and removing said clogging from said filter construction only when said preset threshold value is exceeded.

2. A method according to claim 1, wherein said average calibrating curve of said household drying machine is an air moisture curve with respect to a cycle time of said household drying machine for a preset operating or work load of said household drying machine.

3. A method according to claim 2, wherein said operating or work load is preset based on weight and moisture parameters.

4. A method according to claim 1, further comprising: providing processing and comparing means having at least a first input, a second input and an output; providing alarm means operatively connected to said output of said processing and comparing means; applying to said first input of said processing and comparing means an output signal of said flat capacitive moisture sensor of said filter construction indicative of an alarm air moisture when detected moisture values, which are detected in real time by said flat capacitive moisture sensor of said filter construction, differ from said calibrating curve by more than said preset threshold, said alarm air moisture energizing said alarm means to signal to a user a clogging condition of said filter construction.

5. A method according to claim 1, further comprising providing said monofilament of said synthetic monofilament fabric material consisting of a polymeric material selected from a group consisting of PET, PA, PP, PPS, PEEK, PTFE, PVDF, PE, PVDC, and PEN.

6. A method according to claim 1, further comprising providing said synthetic monofilament fabric material having a thread diameter from 15 μm to 500 μm.

7. A method according to claim 1, further comprising providing said synthetic monofilament fabric material having a thread per centimeter density from 4 to 260.

8. A method according to claim 1, further comprising providing said electrically conductive-capacitive pattern with a coating adapted to protect said pattern from oxidation and mechanical stresses.

9. A method according to claim 1, further comprising providing at least a step of weaving said fabric material and applying or integrating on said fabric material said electrically conductive-capacitive pattern.

10. A method according to claim 1, further comprising making said electrically conductive-capacitive pattern by a silk printing process.

11. A method according to claim 1, further comprising making said electrically conductive-capacitive pattern by an ink jet printing process.

12. A method according to claim 1, further comprising making said electrically conductive-capacitive pattern by a chemical or physical deposition.

13. A method according to claim 1, further comprising making said electrically conductive-capacitive pattern by a laminating operation and a following selective removing operation.

14. A method according to claim 13, further comprising providing said laminating operation and following selective removing operation carried out by a high energy or power source.

15. A method according to claim 13, further comprising providing said laminating operation and following selective removing operation carried out by a chemical etching operation.

16. A method according to claim 1, further comprising making said electrically conductive-capacitive pattern by a partial masking of said fabric material, followed by a further chemical/physical depositing step of depositing an electrically conductive material and a following step of removing said partial masking of said fabric material.

17. A method according to claim 1, further comprising coating said fabric material to provide said fabric material with target surface properties, by a coating method selected from dipping coating, plasma coating, spray coating, foam coating, blade coating, sol-gel coating, and ink-jet coating.

* * * * *